United States Patent Office 2,909,503
Patented Oct. 20, 1959

2,909,503

MIXTURE OF TRIFLUOROCHLOROETHYLENE REACTION PRODUCTS USEFUL AS POTTING AND SEALING COMPOSITIONS

William S. Barnhart, Cranford, N.J., Clifford K. Travis, Riverdale, N.Y., and Chester R. Leder, Princeton, N.J., assignors, by mesne assignments, to Minnesota Mining and Manufacturing Company, St. Paul, Minn., a corporation of Delaware No Drawing. Application June 21, 1955
Serial No. 517,088

1 Claim. (Cl. 260—45.5)

This application relates to novel compositions comprising polymers of trifluorochloroethylene, and particularly to compositions comprising polymers having molecular weights below that of the resinous polymer. In particular, it relates to compositions suitable for the potting and sealing of electrical parts and to a method for preparing such compositions. In addition, it relates to a method of potting and sealing electrical parts and to electrical parts which are coated by the aforementioned novel compositions.

Potting and sealing compositions are used in the electrical industry to stabilize the electrical properties of various electrical elements and parts. For example, they are used to coat such electrical elements as resistors, condensers, transistors and starters for fluorescent lights. A potting or sealing composition must have certain properties to be effective. It must be a good electrical insulator. It must be impervious to air and moisture transmission. It must be physically and chemically stable at relatively high temperatures. It must have a relatively high melting point and must not be subject to softening at temperatures below the melting point. It should preferably produce a relatively low viscosity melt and should preferably be subject to low shrinkage on cooling. In some cases, it may also be desirable that a potting or sealing composition be resistant to corrosion and to chemical action.

The polymers of trifluorochloroethylene are known to have some of the aforementioned properties, in particular, good electrical insulation, substantially zero air and moisture transmission, and good corrosion resistance. However, other properties of a good potting or sealing compound are available in trifluorochloroethylene polymers only by the proper selection and distribution of constituents of varying molecular weights.

It is an object of this invention to produce compositions of trifluorochloroethylene polymers which are suitable as potting and sealing compositions for electrical elements.

It is a further object of this invention to provide a method for thermally degrading resinous trifluorochloroethylene polymers in such a way as to produce a final product which is suitable for use as a potting composition without further treatment.

It is a further object of this invention to produce potting and sealing compositions by the admixture of thermally degraded resinous trifluorochloroethylene polymers with other polymers of trifluorochloroethylene.

It is a further object of this invention to provide a method for potting and sealing of electrical parts in order to stabilize their electrical characteristics.

It is a further object of this invention to produce coated electrical elements of exceptional stability insofar as their electrical characteristics are concerned.

These and other objects are obtained by the preparation of a fluorochlorocarbon wax by the thermal degradation of a resinous polymer of trifluorochloroethylene having a NST (no strength temperature) from about 220° to about 320° C. at a temperature from about 300° to 400° C. until a Shore D hardness of 35 to 50 is attained.

The thermal degradation of higher to lower molecular weight polymers of trifluorochloroethylene for the purpose of producing products in the liquid and soft waxy range, is known. In such degradations, it has been customary to start with a polymer having a relatively low molecular weight, lower than the molecular weight of the resin, and to produce a product containing mixed, liquid and soft waxy fractions as well as a relatively high proportion of trifluorochloroethylene monomer.

It has been found that by starting with a resin having a NST between about 220° and 320 C., and preferably between about 240° and 300° C., and by maintaining a controlled temperature between about 300° C. and 400° C., and preferably between about 300° and 350° C., and by limiting the duration of the degradation process to that which produces a product having a Shore D hardness between 35 and 50, the production of liquid degradation products and monomer is substantially eliminated and a total product is obtained which is suitable for use as a potting and sealing composition without further treatment or purification.

The degradation process is preferably carried out as a batch operation on comminuted resin. Representative samples of the resin undergoing thermal degradation are periodically withdrawn, cooled and tested for Shore D hardness by the standard ASTM method (ASTM D-785). The degradation process is continued until the desired Shore D hardness is reached. The duration of the degradation process will vary with the size of the batch, the temperature employed, the distribution of heat in the vessel and the molecular weight of the resinous starting material and the hardness desired within the above range. In general, the duration may vary from 4 hours to 4 days.

Upon the attainment of the desired Shore D hardness test, the heating is discontinued and the product is withdrawn. This product, without any further treatment, may be used as a potting and sealing composition. The product is relatively inert, has a relatively high melting point and has good electrical insulating properties. Electrical elements, dipped into a melt of this composition, are coated, upon withdrawal and cooling, with a thin impervious layer of trifluorochloroethylene polymer which protects the electrical elements against changes in electrical characteristics.

The aforementioned thermally degraded product contains some unsaturation and, therefore, may have some chemical activity at relatively high temperatures. It may, for example, give off an acidic odor and may produce HCl or HF on standing, and thereby cause erosion of some electrical elements. This effect may be minimized by treating the wax materials with anhydrous activated alumina or silica gel, or other substances, to remove impurities which may aid the degradation, or it may be eliminated by fluorinating or chlorinating the wax material with a fluorination or chlorination agent, such as cobalt trifluoride, chlorine trifluoride or chlorine, to take up the unsaturation. The thermally degraded product may be fluorinated or chlorinated by treatment with a stoichiometric excess of fluorination or chlorination reagent, generally at a temperature between 100 and 150° C. Waxes stabilized by fluorination or chlorination may be used for prolonged periods of time at relatively high temperatures without any acidic odor being observed and without any corrosive effect. Stabilization by fluorination or chlorination has substantially no effect on the general physical characteristics of the thermally degraded polymer.

The product of the controlled thermal degradation of trifluorochloroethylene polymer resin, either with or without stabilization, is, in general, a hard brittle wax which may be used satisfactorily for the sealing and coating of capacitors and various paper, cardboard and fabric articles. However, where good adhesion to glass and metal surfaces is required, and where shrinkage or cooling must be minimized, it is generally preferred to increase the tackiness and decrease the shrinkage of this product by admixture with low molecular weight polymers of trifluorochloroethylene. It is to be understood that the term "polymer of trifluorochloroethylene" as used herein includes all molecules composed essentially of $(CF_2CFCl)$ units. Thus, the term includes materials produced by thermal degradation and containing small amounts of unsaturation. The term includes materials made by thermal degradation and subsequent stabilization by fluorination, despite the fact that such molecules might contain a slight excess of fluorine. The term includes telomers of trifluorochloroethylene, despite the presence of other atoms in the end groups, and the term includes polymers having small amounts of other monomeric units in the chain.

The lower molecular weight polymers used in accordance with this invention are those which have a melting point not higher than about 80° C., or those which have a boiling range at a pressure of one millimeter of mercury up to about 300° C. Preferably, the lower molecular weight polymers comprise the fractions between 200° C. and 300° C. at one millimeter of Hg.

The lower molecular weight polymers may be prepared by the telomerization of trifluorochloroethylene monomer in the presence of a solvent, such as carbon tetrachloride, in the presence of a free radical producer, such as benzoyl peroxide, and in the presence of a telogen, such as sulfuryl chloride.

The telomerization preferably takes place in the presence of benzoyl peroxide which is dissolved in a solvent, such as carbon tetrachloride, while the chlorotrifluoroethylene monomer is added under pressure in a closed system. In a specific example, 3.5 parts of benzoyl peroxide are dissolved in 308 parts of carbon tetrachloride and 135 parts of sulfuryl chloride. 116 parts of chlorotrifluoroethylene monomer is added and the system is heated to about 95° C. for a period of 4 hours with agitation to produce a high yield of relatively low molecular weight polymers having the above formula. The telomeric product is relatively easy to separate into its individual compounds by distillation since it contains only compounds having an even number of carbon atoms, so that each compound has a boiling point relatively far removed from that of the next lower or next higher compound. A detailed description of telomerization with sulfuryl halides may be found in the copending application of William S. Barnhart, Serial No. 294,495, filed June 19, 1952 now Patent Number 2,770,659.

Similarly, a telomeric product containing compounds having an odd number of carbon atoms may be prepared in high yields, using a bromoperhalomethane, such as bromotrichloromethane, as the telogen.

Another method of producing lower molecular weight polymers of trifluorochloroethylene involves the thermal degradation of higher molecular weight materials, including resinous materials. This thermal degradation differs from the thermal degradation described above in that higher temperatures and longer degradation periods may be employed, particularly with resinous starting materials. In this manner, relatively large proportions of liquid and soft waxy products are obtained, making a product which is capable of producing tackiness when blended with the higher molecular weight material.

Since thermally degraded material in the lower molecular weight range generally has a higher degree of unsaturation per unit weight than the thermally degraded material in the higher molecular weight range, it is preferable to stabilize the lower molecular weight material regardless of whether or not the higher molecular weight material is stabilized. Stabilization is achieved, as stated above, by reacting the thermally degraded polymer with a fluorinating or chlorinating agent, such as chlorine trifluoride, cobalt trifluoride or chlorine, until the unsaturation is substantially removed.

In general, the lower molecular weight material may be added to the product of the controlled degradation of the resin in proportions up to about 60 weight percent of the combined higher and lower molecular weight polymers. The compounds increase in hardness with higher percentages of the product of controlled thermal degradation, and increase in tackiness with higher percentages of the lower molecular weight polymers.

EXAMPLE 1

5 lb. of 220 NST polytrifluorochloroethylene resin, ground to pass through a ¼" screen, was placed in a 5 lb. flask equipped with a spherical Glas-Col heating mantle. The flask was heated at 300° C.±10° as indicated by a thermometer suspended in the molten polymer. This operation was done in a hood. Gradual breakdown of the polymer occurred with gases bubbling from the melt. A small sample of the melt was poured into an aluminum foil weighing dish. The sample was allowed to cool to room temperature and the Shore D hardness determined. This procedure was continued until the Shore D hardness was down to 35–50, at which time the heating was discontinued. The heating took about 24 hours. The wax was slightly off-white in color and had a softening point of 180° C.

EXAMPLE 2

1 lb. of the wax from Example 1 was mixed with 0.25 lb. of lower molecular weight trifluorochloroethylene polymer and the mixture melted, stirred and filtered through a sintered glass filter. The lower molecular weight polymer used here was the product of the telomerization of trifluorochloroethylene with sulfuryl chloride stripped of the fraction of oil boiling below 275° C. The final product was a firm, hard wax with a Shore D hardness of 20–25 and a softening point of 135° C.

EXAMPLE 3

In this example 220 NST polytrifluorochloroethylene was heated in an oven at 300° C. for a period of about 70 hours. The wax produced had a Shore D hardness of 35.

EXAMPLE 4

The wax of Example 3 was mixed with lower molecular weight trifluorochloroethylene polymer in the proportions shown in Table I and the service temperature and flow temperature measured. The service temperature is that temperature at which the compounded wax in the shape of a cone is soft but retains its dimensions unless external pressure is applied.

Table I

| Wax, percent | Lower M.W. Polymer, percent | Service Temperature, °C. | Flow Temperature, °C. |
|---|---|---|---|
| 10 | 90 | 115 | 155 |
| 20 | 80 | 130 | 170 |
| 30 | 70 | 145 | 185 |
| 40 | 60 | 155 | 195 |
| 50 | 50 | 160 | 200 |

We claim:

A fluorochlorocarbon wax composition suitable as a potting composition comprising 10–50% by weight of a hard wax component, having a Shore D hardness between 35 and 50, prepared by the thermal degradation of a resinous polymer of trifluorochloroethylene having an NST value between 220 and 320° C. admixed with 50–90% by weight of a lower molecular weight sulfuryl chloride telomer of trifluorochloroethylene having a melting point not higher than about 80° C.

References Cited in the file of this patent

UNITED STATES PATENTS

| | | |
|---|---|---|
| 2,497,046 | Kropa | Feb. 7, 1950 |
| 2,543,530 | Kropa et al. | Feb. 27, 1951 |
| 2,643,988 | Walter | June 30, 1953 |
| 2,664,449 | Miller | Dec. 29, 1953 |
| 2,695,880 | Benning | Nov. 30, 1954 |

OTHER REFERENCES

U.S. Dept. Interior, Bur. Mines Report of Investigations No. 4756, pages 4–6 (December 1950).